G. P. ALTENBERG & F. BOEHM.
DOUBLE-WALLED VESSEL.
APPLICATION FILED APR. 30, 1908.
991,409.
Patented May 2, 1911.
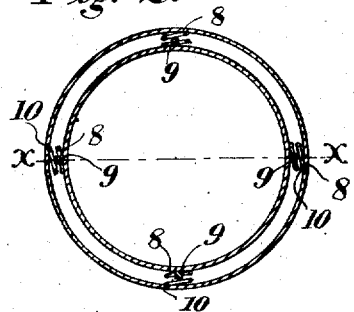
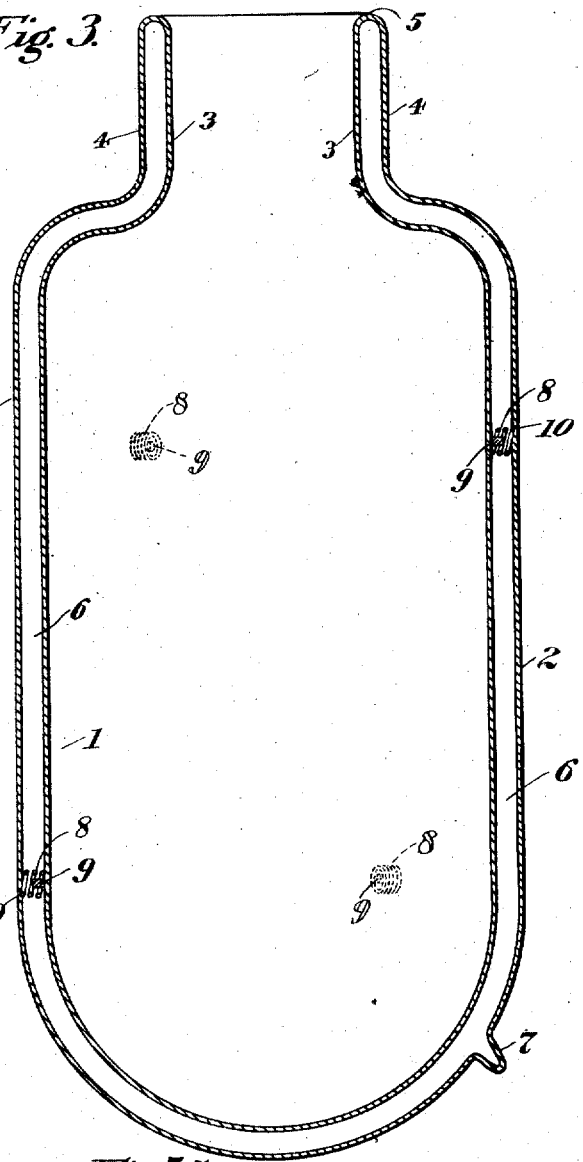
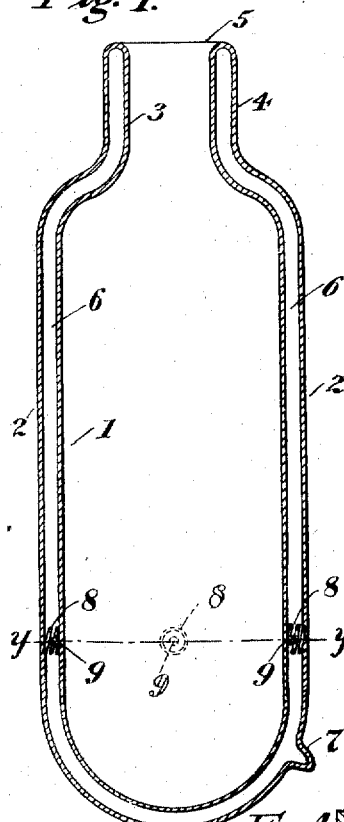
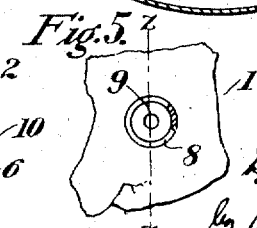

UNITED STATES PATENT OFFICE.

GEORGE P. ALTENBERG AND FRANZ BOEHM, OF CINCINNATI, OHIO; SAID BOEHM ASSIGNOR TO SAID ALTENBERG.

DOUBLE-WALLED VESSEL.

991,409. Specification of Letters Patent. Patented May 2, 1911.

Application filed April 30, 1908. Serial No. 430,166.

*To all whom it may concern:*

Be it known that we, GEORGE P. ALTENBERG and FRANZ BOEHM, respectively a citizen of the United States of America and a subject of the Emperor of Germany, residing at Cincinnati, in the county of Hamilton and State of Ohio, have jointly invented certain new and useful Improvements in Double-Walled Vessels, (Case A,) of which the following is a specification.

Our invention relates to double walled vessels and has for its object the providing of new and improved means for separating and supporting the members of the vessel from each other, and the invention will be readily understood from the following description and claims, and from the drawing, in which latter:

Figure 1 is a central vertical section of our improved device taken on a line corresponding to the line x—x of Fig. 2. Fig. 2 is a horizontal section thereof taken on a line corresponding to the line y—y of Fig. 1. Fig. 3 is a central vertical section of our improved device, showing a larger vessel than that shown in Fig. 1 and also showing a plurality of rows of separators in the space between its members. Fig. 4 is an enlarged detail in section on a line corresponding to the line z—z of Fig. 5; and, Fig. 5 is a detail in front elevation showing the coiled separator received about its stud and partly broken away.

1 represents the inner member and 2 the outer member of the vessel, which may respectively be provided with necks 3 4. The members are preferably joined at the mouth 5 of the vessel, preferably by fusing. The vessel is preferably formed of glass. A space 6 is formed between the members of the vessel, the space surrounding the inner member thereof. This space is a heat-insulating space, and the air in it is preferably withdrawn or practically exhausted for forming a vacuum. This air may be withdrawn through a nipple 7 which is afterward sealed. The wall of the space may also be provided with suitable silvering solution.

8 8 are coiled separators located in the space 6 between the members 1 2 and are provided for the purpose of supporting the members of the vessel from each other to resist fracture of the vessel. These coiled separators are preferably located in a row about the lower end of the inner member. In Fig. 3 we have shown these coiled separators arranged in two rows, and when so arranged the separators of the respective rows may be in different vertical planes.

Studs 9 9 are secured to the wall of said space, preferably to the inner member of the vessel, these studs being other than the glass of said members in order that the uniform thickness and smoothness of said wall may not be disturbed. They are preferably fused to said wall. The coiled separators are received about said studs. They form cushions between said members. These coiled separators are shown with their ends presented toward the respective members of said vessel, with one of the ends of said coils received about said studs, the other ends of said respective coils being shown embedded in or received by the opposite member of said vessel, as shown at 10. In this manner the respective coiled separators are securely positioned. The embedding of said coiled separators into the member is accomplished by locally heating said member and forming the glass about the strand of said coil while in plastic state. The coil-separator is preferably made of a material around which glass can be formed or fused, and we have found copper a serviceable material for the purpose although platinum or other material having substantially similar properties may be employed.

The several coils of the coiled separator are themselves separated by the heat-insulating space between the members of the vessel, so that any transference of heat between the members of the vessel must take place lengthwise of the stretches of the coils, thereby reducing to the minimum the cross-sectional area of the body of material through which the transference of heat may take place and causing said heat to follow a tortuous course for a comparatively great distance through said body.

Having thus fully described our invention what we claim as new and desire to secure by Letters Patent is:

1. A double walled glass vessel comprising in combination an inner member and an outer member connected at the mouth of said vessel and having heat-insulating space therebetween, a stud on the wall of said space, and a separator for said members in said space between said members received about but normally spaced from said stud.

2. A double walled vessel comprising in combination an inner member and an outer member connected at the mouth of said vessel for preventing relative movement between said members at said mouth and having a rarefied space therebetween, and a coiled separator for said members in said rarefied space between said members embedded in a wall of said space at a distance from said mouth.

3. A double walled vessel comprising in combination an inner member and an outer member connected at the mouth of said vessel and having a heat-insulating space therebetween, studs on the wall of said space, and coiled separators for said members in said space between said members respectively received about said studs at one of the ends of said respective coiled separators, the other of the ends of said respective coiled separators embedded in the wall of said space opposite said respective studs.

4. A double walled vessel comprising in combination an inner member and an outer member having hermetic connection at the mouth of said vessel for preventing relative movement between said members at said mouth and having a heat-insulating space therebetween, and coiled separators for said members in said space between said members whose respective ends are presented to the respective walls of said space, the coils of said respective coiled separators being normally spaced apart and having heat-insulating space between them, substantially as described.

5. A double walled glass vessel comprising in combination an inner member and an outer member having hermetic connection at the mouth of said vessel for preventing relative movement between said members at said mouth and having a heat-insulating space therebetween, and a coiled metal cushioning separator in said space between said members, the coils of said coiled separator being normally spaced apart and having heat-insulating space between them.

6. In combination, a double walled vessel of the character described comprising an inner member and an outer member having hermetic connection at the mouth of said vessel and having sealed heat-insulating space therebetween, and coiled cushioning means between said members in said space, the coils whereof are normally spaced apart and have heat-insulating space between them, the wall of said space being provided with positioning means for positioning said coiled cushioning means.

7. A double walled vessel comprising in combination an inner member and an outer member having hermetic connection at the mouth of said vessel for preventing relative movement between said members at said mouth and having a heat-insulating space therebetween, and coiled separators for said members in said space between said members in a plurality of horizontal rows, the coiled separators of the respective rows being in different vertical planes, the coils of said respective coiled separators being normally spaced apart and having heat-insulating space between them.

8. A double walled glass vessel comprising in combination an inner member and an outer member connecting at the mouth of said vessel and having heat-insulating space therebetween, studs secured to said inner member in said space, spiral separators for said members in said space between said members having their ends presented toward said members, said spiral separators at their inner ends received about said studs and at their outer ends embedded in said outer member in said space, substantially as described.

9. A double walled vessel comprising in combination an inner member and an outer member having hermetic connection at the mouth of said vessel and having a heat-insulating space therebetween and so constructed as to prevent relative movement between said members at said mouth, a stud on the face of one of said members in said space, and a coiled cushion between said members in said heat-insulating space received about said stud, the coils of said coiled cushion being normally spaced apart and having heat-insulating space between them.

10. In a double walled vessel, the combination with the inner and outer members of said vessel having hermetic connection at its mouth for preventing relative movement between said members and having rarefied heat-insulating space between said members, a series of coiled elastic separating members in said rarefied heat-insulating space between said members of said vessel, and studs secured to the inner face of said vessel within said rarefied heat-insulating space encompassed by said coiled separating members, said studs being shorter than the distance between the adjacent walls of said space, and the coils of said respective coiled separating members being normally spaced apart and having heat-insulating space between them whereby transference of heat between said members through said respective coiled separating members must take place lengthwise of the coils of said respective coiled separating members, substantially as described.

11. In combination, a double walled vessel of the character described comprising an inner member and an outer member connected at the mouth of said vessel and having hermetically sealed heat-insulating space therebetween, a coiled separating means in said space between said members forming the sole connecting means between the said members except the connection therebetween at said mouth, and positioning means in said space for said coiled separating means, the coils of said coiled separating means being normally spaced apart and having heat-insulating space between them, substantially as described.

12. In combination, a double walled vessel of the character described comprising an inner member and an outer member having heat-insulating space between them, and a coiled separator in said heat-insulating space having its ends presented toward said members, the wall of said space being provided with positioning means for positioning said coiled separator between said members, said positioning means being shorter than the distance between the adjacent walls of said space, the respective coils of said coiled separator being normally spaced apart and having heat-insulating space between them, substantially as described.

In testimony whereof, we have subscribed our names hereto in the presence of two subscribing witnesses.

GEORGE P. ALTENBERG.
FRANZ BOEHM.

Witnesses:
EARLE R. PASSEL,
FLORENCE QUINN.